US008353056B2

(12) United States Patent
Han et al.

(10) Patent No.: US 8,353,056 B2
(45) Date of Patent: Jan. 8, 2013

(54) APPARATUS AND METHOD FOR DETECTING PROGRAM PLAGIARISM THROUGH MEMORY ACCESS LOG ANALYSIS

(75) Inventors: Sang Yong Han, Gyeonggi-do (KR); Sung Yun Park, Seoul (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 814 days.

(21) Appl. No.: 12/067,665

(22) PCT Filed: Oct. 30, 2007

(86) PCT No.: PCT/KR2007/005379
§ 371 (c)(1),
(2), (4) Date: Mar. 21, 2008

(87) PCT Pub. No.: WO2008/088121
PCT Pub. Date: Jul. 24, 2008

(65) Prior Publication Data
US 2010/0242023 A1    Sep. 23, 2010

(30) Foreign Application Priority Data
Jan. 18, 2007   (KR) .................. 10-2007-0005827

(51) Int. Cl.
*G06F 9/44* (2006.01)
*G06F 17/40* (2006.01)
*G06F 7/04* (2006.01)
(52) U.S. Cl. ..................... 726/32; 717/127; 702/187
(58) Field of Classification Search ................... None
See application file for complete search history.

(56) References Cited

U.S. PATENT DOCUMENTS

| | | | |
|---|---|---|---|
| 6,748,584 B1 * | 6/2004 | Witchel et al. | 717/136 |
| 7,503,035 B2 * | 3/2009 | Zeidman | 717/123 |
| 7,802,236 B2 * | 9/2010 | Calder et al. | 717/130 |

(Continued)

FOREIGN PATENT DOCUMENTS

KR    1020040064681    7/2004

OTHER PUBLICATIONS

Clough, Paul. "Plagiarism in natural and programming languages: an overview of current tools and technologies." Research Memoranda: CS-00-05, Department of Computer Science, University of Sheffield, UK. Jun. 2000. pp. 1-31.*

(Continued)

*Primary Examiner* — Insun Kang
*Assistant Examiner* — Erika Kretzmer
(74) *Attorney, Agent, or Firm* — Occhiuti Rohlicek & Tsao LLP

(57) ABSTRACT

An apparatus and method for detecting program plagiarism through memory access log analysis is provided. A data extractor extracts an access log of an original program and an access log of a target program to be compared with the original program from a memory accessed by the programs. A common string detector enumerates values, which are obtained from the access logs extracted from the original program and the target program, into strings and detects a common string that commonly exists in the strings. A discontinuity calculator calculates a discontinuity value that indicates a distance between the strings by using an array of the detected common strings. A plagiarism determining unit determines that the target program is plagiarized if the calculated discontinuity value is less than a predetermined reference value.

13 Claims, 5 Drawing Sheets

U.S. PATENT DOCUMENTS

| | | | |
|---|---|---|---|
| 2004/0111708 A1* | 6/2004 | Calder et al. | 717/131 |
| 2005/0114840 A1* | 5/2005 | Zeidman | 717/126 |
| 2006/0005166 A1 | 1/2006 | Atkin et al. | |
| 2006/0145896 A1 | 7/2006 | Venkatesan et al. | |

OTHER PUBLICATIONS

Wise, "YAP3: Improved Detection of Similarities in Computer Program and Other Texts," ACM, 1996.*

Moussiades et al., "PDetect: A Clustering Approach for Detecting Plagiarism in Source Code Datasets," Advance Access published on Jun. 24, 2005.*

Liu et al., "GPLAG: Detection of Software Plagiarism by Program Dependence Graph Analysis," ACM, 2006.*

Prechelt et al., "JPlag: Finding plagiarisms among a set of programs," Mar. 28, 2000.*

Son et al., "Program Plagiarism Detection Using Parse Tree Kernels," Springer-Verlag Berlin Heidelberg 2006.*

Ellis et al., "Plagiarism Detection in Computer Code," Mar. 23, 2005.*

Wise, "Running Karp-Raabin Matching and Greedy String Tiling," CiteSeer, 1993.*

* cited by examiner

APPARATUS AND METHOD FOR DETECTING PROGRAM PLAGIARISM THROUGH MEMORY ACCESS LOG ANALYSIS

CROSS-REFERENCE TO RELATED APPLICATIONS

This application is the National Stage of International Application No. PCT/KR2007/005379, filed on Oct. 30, 2007, which claims the priority of Korean Application No. 10-2007-0005827, filed on Jan. 18, 2007. The contents of both applications are hereby incorporated by reference in their entirety.

TECHNICAL FIELD

The present invention relates to an apparatus and method for detecting program plagiarism, and more particularly, to an apparatus and method for detecting program plagiarism through a memory access log analysis.

BACKGROUND

In regards to protection of intellectual property rights, there are various software copyright problems. Examples of the problems include illegal use and distribution of software products and copyright infringement caused by program plagiarism in software production. Among the problems, the use of illegal software can be easily detected. However, regarding the program plagiarism problem, it is difficult to determine whether plagiarism is made or not.

To address such problems, several methods of detecting program plagiarism have been studied. In the conventional methods which have been proposed so far to measure a program similarity, source codes of programs are analyzed and numericalized in various manners so as to determine a similarity between two programs to be compared with each other. Specifically, comparison is performed by using software metrics, or by comparing a token array of source codes or comparing function call relationships, or by analyzing a tree structure. In particular, researches on a method of detecting plagiarized programs from students assignments are widely being conducted, and a variety of results are being released by many universities worldwide. In this regards, systems (e.g., Plague, YAP3, MOSS, Clonechecker, etc.) have been introduced, in which source programs are input so that plagiarism is detected by measuring a similarity between two source programs. Disadvantageously, however, these conventional methods can be used only when source programs are obtained.

DISCLOSURE

Summary

The present invention provides an apparatus and method capable of detecting program plagiarism by determining a similarity of programs without having to use source programs.

The present invention also provides a computer-readable medium having embodied thereon a computer program for executing a method capable of detecting program plagiarism by determining a similarity of programs without having to use source programs.

According to an aspect of the present invention, an apparatus for detecting program plagiarism is provided. The apparatus includes: a data extractor for extracting an access log of an original program and an access log of a target program to be compared with the original program from a memory accessed by the programs; a common string detector for enumerating values, which are obtained from the access logs extracted from the original program and the target program, into strings and for detecting a common string that commonly exists in the strings; a discontinuity calculator for calculating a discontinuity value that indicates a distance between strings by using an array of the detected common strings; and a plagiarism determining unit for determining that the target program is plagiarized if the calculated discontinuity value is less than a predetermined reference value.

According to another aspect of the present invention, an apparatus for detecting program plagiarism is provided. The apparatus includes: a data extractor for extracting an access log of an original program and an access log of a target program to be compared with the original program from a memory accessed by the programs; a common string detector for enumerating values, which are obtained from the access logs extracted from the original program and the target program, into strings and for detecting a common string that commonly exists in the strings; a similarity calculator for calculating a similarity value that indicates a level of coincidence of strings by using an array of the detected common strings; and a plagiarism determining unit for determining that the target program is plagiarized if the calculated similarity value is greater than a predetermined reference value.

According to another aspect of the present invention, a method of detecting program plagiarism is provided. The method includes: extracting an access log of an original program and an access log of a target program to be compared with the original program from a memory accessed by the programs; enumerating values, which are obtained from the access logs extracted from the original program and the target program, into strings and detecting a common string that commonly exists in the strings; calculating a discontinuity value that indicates a distance between strings by using an array of the detected common strings; and determining that the target program is plagiarized if the calculated discontinuity value is less than a predetermined reference value.

According to another aspect of the present invention, a method of detecting program plagiarism is provided. The method includes: extracting an access log of an original program and an access log of a target program to be compared with the original program from a memory accessed by the programs; enumerating values, which are obtained from the access logs extracted from the original program and the target program, into strings and detecting a common string that commonly exists in the strings; calculating a similarity value that indicates a level of coincidence of strings by using an array of the detected common strings; and determining that the target program is plagiarized if the calculated similarity value is greater than a predetermined reference value.

Accordingly, even when a source code is not obtained, program plagiarism can be accurately and rapidly detected by analyzing a memory access log of a program.

As described above, in apparatus and method for detecting program plagiarism according to the Present invention, even when a source code is not obtained, program plagiarism can be accurately and rapidly detected by analyzing a memory access log of a program.

DESCRIPTION OF DRAWINGS

The above and other features and advantages of the present invention will become more apparent by describing in detail exemplary embodiments thereof with reference to the attached drawings in which.

DESCRIPTION

Hereinafter, exemplary embodiments of the present invention will be described in detail with reference to the accompanying drawings.

Figure 1:
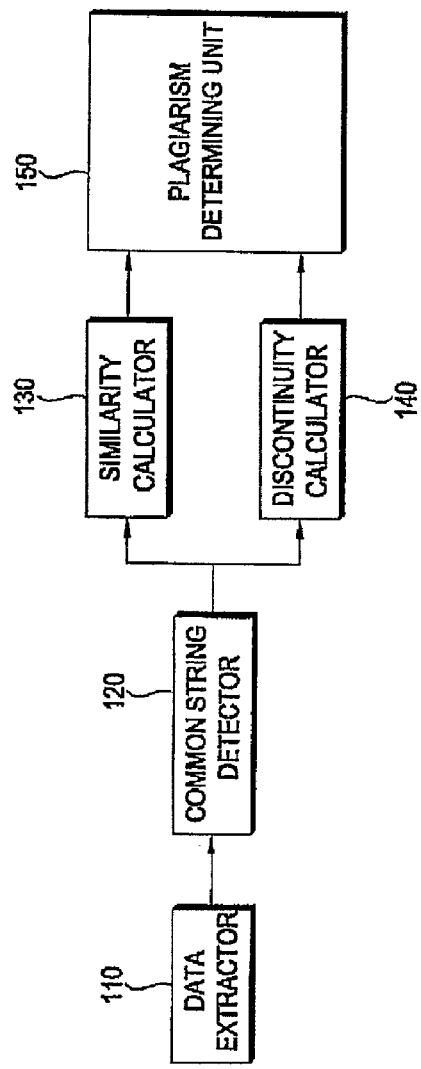
FIG. 1 is a block diagram illustrating a structure of an apparatus for detecting program plagiarism according to an embodiment of the present invention.

FIG. 1 is a block diagram illustrating a structure of an apparatus for detecting program plagiarism according to an embodiment of the present invention.

Referring to FIG. 1, the apparatus of the present invention includes a data extractor 110, a common string detector 120, a similarity calculator 130, a discontinuity calculator 140, and a plagiarism determining unit 150.

The data extractor 110 extracts an access log of a target program to be compared with an original program from a memory used by the programs. In order to extract memory access information on a program, memory allocation has to be managed when the program is loaded on the memory, and all memory areas used by the program have to be monitored. The data extractor 110 uses a memory protection scheme (e.g., read, write, etc.) to extract information by checking memory addresses and values whenever the memory is accessed.

Instructions supported by latest processors have various formats. According to a method of processing an operation result, most instructions may be classified as described in Table 1 below.

TABLE 1

| Method Of Processing Operation Result | Function |
|---|---|
| Write To Memory | Write Operation Result To Memory |
| Write To Register | Store Operation Result In Register |
| Control Operation | Change Flow Of Code Execution (Without Storing The Result) |
| Port I/O (Input/Output) | Read Value From Port Or Write Value To Port |

Referring to Table 1, the control operation represents changes in a procedure for performing a memory operation or a register operation. When results are generated after performing the operation, the results are written to a register (or memory) of a processor or to a specific hardware port. Before data is stored in the memory, the data may be stored in the register. Further, the register may serve as a storage element for recording temporary values of the operation. That is, the register functions as a temporary storage element. A port I/O itself is generally provided to facilitate an operation of a corresponding hardware device, and does not perform a specific function. Similar to memory access, the port I/O is a process in which one value is read or written. Thus, a process of writing a value corresponding to the port I/O may be regarded as a process of writing an operation result to the memory. Results obtained by performing programs are recorded in a log according to the aforementioned methods of processing the operation result, and as a result, information on "Read/Write", "Address", and "Value" may be recognized.

The data extractor 110 extracts information on memory access while operating the original program and the target program. Examples of the extracted information are described in Table 2 below.

TABLE 2

| Original Program | | | Target Program | | |
|---|---|---|---|---|---|
| Read/Write | Address | Value | Read/Write | Address | Value |
| R | 00980040 | 000000a | R | 00980050 | 0000008 |
| R | 00980050 | 0000007 | R | 00980030 | 0000004 |
| R | 00980050 | 0000007 | W | 00980070 | 0000004 |
| W | 00980060 | 0000007 | R | 00980060 | 0000008 |
| . | . | . | . | . | . |
| . | . | . | . | . | . |
| R | 00980020 | 0000008 | R | 00980018 | 0000001 |
| R | 00980060 | 0000004 | R | 00980080 | 0000002 |
| W | 00980070 | 0000004 | W | 00980080 | 0000003 |

In the plagiarism detection apparatus according to an embodiment of the present invention, only values are used as comparison data. However, in another embodiment, "Read/Write", "Address", and "Value" described in Table 2 may all used in the determination of plagiarism.

Figure 2:
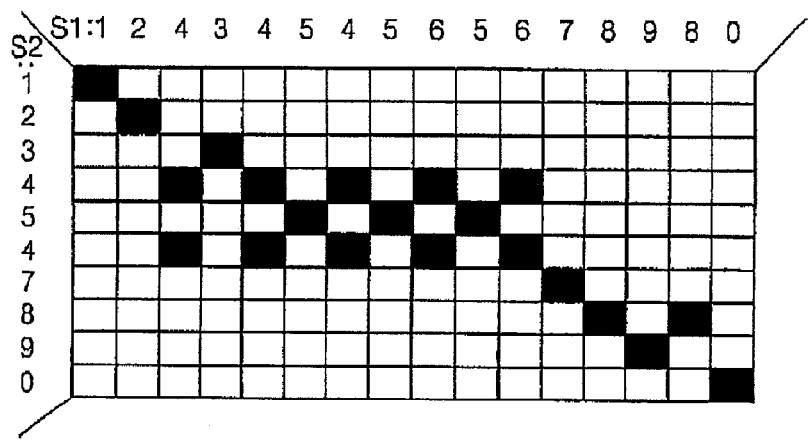
FIGS. 2 and 3 respectively illustrate an area image and a line image composed of detected common strings.
Figure 3:
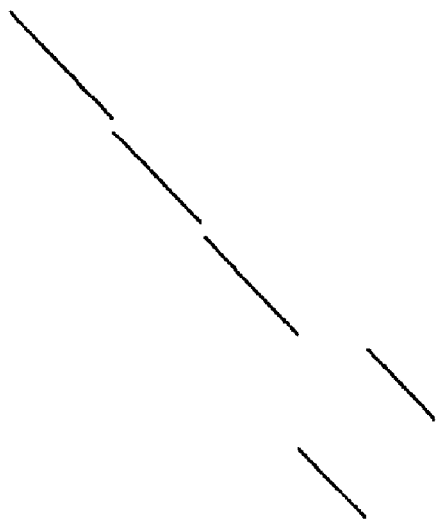

The common string detector 120 enumerates values v, which are obtained from the access logs extracted from the original program and the target program, into strings $S_1$ and $S_2$. Each of the strings $S_1$ and $S_2$ is subject to a tiling process according to a string comparison algorithm (i.e., a Greedy-String-Tiling (GST) algorithm), thereby detecting a common string c. FIG. 2 illustrates an area image composed of only common strings detected by the common string detector 120, where the horizontal axis corresponds to $S_1$ and the vertical axis corresponds to $S_2$. FIG. 3 illustrates a line image composed of only common strings detected by the common string detector 120, with the same horizontal and vertical axes as the corresponding area image of FIG. 2.

In this case, the respective strings $S_1$ and $S_1$ can be expressed by Math FIG. 1 below.

$$S_1 = (v_{1,1}, v_{1,2}, \ldots, v_{1,a})$$

$$S_2 = (v_{2,1}, v_{2,2}, \ldots, v_{2,b}) \qquad \text{[Math FIG. 1]}$$

In addition, an array of the common strings c detected by the common string detector 120 is expressed by Math FIG. 2 below.

$$CS(S_1, S_2) = \{c_1, c_2, c_3, \ldots c_n\} \qquad \text{[Math FIG. 2]}$$

Herein, $CS(S_1, S_2)$ denotes an array of a plurality of $c_i$ sorted with respect to $x_i$ or $y_i$, where $c_i$ denotes $(x_i, y_i, l_i)$, $x_i$ denotes a starting point of $c_i$ in $S_1$, $y_i$ denotes a starting point of $c_i$ in $S_2$, and $l_i$ denotes the length of $c_i$.

By using the array CS of the common strings detected by the common string detector 120, the similarity calculator 130 calculates a similarity value $m_p$ that indicates a level of coincidence between $S_i$ and $S_2$ according to Math FIG. 3 below.

$$m_p = \sum_{i=1}^{n} (l_i)^p \qquad \text{[Math FIG. 3]}$$

Herein, if p=0, $m_p$ denotes the number n of common strings. If p=1, $m_p$ denotes the total length of common strings. If p=2, $m_p$ denotes the sum of squares for common string lengths.

Figure 4:
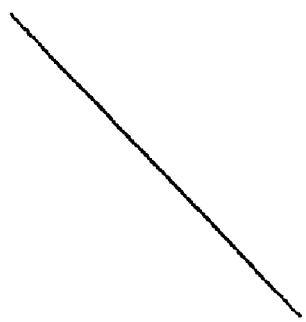
FIGS. 4 to 11 illustrate line images and area images obtained by performing a string comparison algorithm (i.e., a Greedy-String-Tiling (GST) algorithm) on a plurality of target programs.

The discontinuity calculator 140 calculates a discontinuity value M that indicates a distance between strings by using the array CS of the common strings detected by the common string detector 120, according to Math FIG. 4 below. The CS is an array of a plurality of common strings c sorted with respect to x or y. The discontinuity calculator 140 calculates an area distance that indicates a distance from an upper left end of a common string $c_b$ to a reference point, that is, a lower right end of a common string $c_a$, wherein the two common strings $c_a$ and $c_b$ are adjacent to each other. This operation is performed by the discontinuity calculator 140 for the entire common strings in the array CS, thereby calculating each area distance. Thereafter, the discontinuity calculator 140 sums all area distances calculated for the entire common strings in the array CS, and then normalizes the summation result to a total area. Such process can be expressed by Math FIG. 4.

$$c_{xmax} = (x_{xmax}, y_{xmax}, l_{xmax})$$

$$c_{ymax} = (x_{ymax}, y_{ymax}, l_{ymax})$$ [Math FIG. 4]

Herein, $c_{xmax}$ denotes c having maximum x in CS, and $c_{ymax}$ denotes c having a maximum y in CS.

Figure 5:
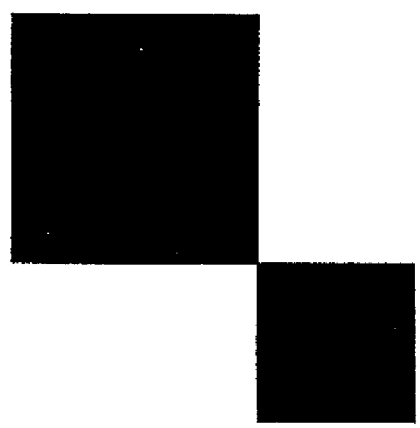

Meanwhile, if CS' ($S_1$, $S_2$) is defined as Math FIG. 5, a discontinuity that indicates a level of discontinuity of CS' ($S_1$, $S_2$) can be calculated as follows.

$$CS'(S_1, S_2) = CS(S_1, S_2) \cup \{c_0, c_{n+1}\}$$ [Math FIG. 5]

Herein, $c_0$ is (1, 1, 0), and $c_{n+1}$ is ($x_{xmax} + 1_{xmax} - 1$, $y_{ymax} + 1_{ymax} - 1$, 0).

Figure 6:
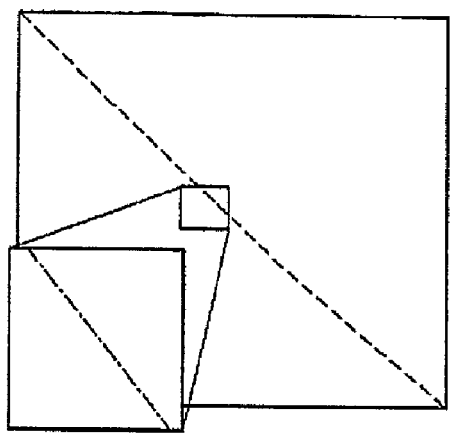

Finally, the discontinuity calculator 140 calculates a discontinuity value M that indicates a level of discontinuity of CS' ($S_1$, $S_2$) according to Math FIG. 6 below.

$$M = \frac{\sum_{i=0}^{n} \{|x_{i+1} - (x_i + l_i - 1)| \times |y_{i+1}(y_i + l_i - 1)|\}}{x_{n+1} \times y_{n+1}}$$ [Math FIG. 6]

According to the similarity value $m_p$ calculated by the similarity calculator 130 or the discontinuity value M calculated by the discontinuity calculator 140, the plagiarism determining unit 150 determines whether the target program is plagiarized. If the similarity value $m_p$ is greater than a predetermined first reference value, the plagiarism determining unit 150 determines that the target program is plagiarized. If the discontinuity value M is less than a predetermined second reference value, the plagiarism determining unit 150 determines that the target program is plagiarized. The first and second reference values are determined through experimentations.

For example, if p>1, although common strings have the same length in total, a common string having a longer length has a greater similarity value $m_p$ calculated according to Math FIG. 3. If the similarity value $m_p$ is normalized to the sum of string lengths (i.e., length($S_1$)+length($S_2$)), the greater the similarity, the more similar the memory access log is. Thus, it can be concluded that operations of the two programs to be compared with each other are further similar to each other. Meanwhile, the discontinuity value M is a value that indicates discontinuity of the two programs. This means that the two programs have a higher continuity when the value becomes close to zero. Therefore, when two strings exactly coincide with each other, the discontinuity value M is 0, and when there is no common string, the discontinuity value M is 1.

In Table 3 below, the similarity value $m_p$ and the discontinuity value M are described according to a comparison result between one original program and four target programs. In addition, FIG. 4 to FIG. 11 illustrate line images and area images obtained by performing a string comparison algorithm (i.e., the GST algorithm) on a plurality of target programs.

TABLE 3

| Program | Similarity ($m_p$/(len($S_1$ + $S_2$))) | Discontinuity (M) |
|---|---|---|
| Program 1 | 0.514463 | 0.000344 |
| Program 2 | 0.008190 | 0.005818 |
| Program 3 | 0.138358 | 0.033524 |
| Program 4 | 0.014254 | 0.261336 |

Figure 7:
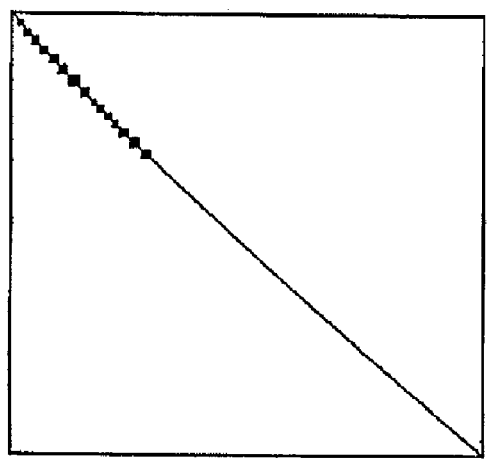
Figure 8:
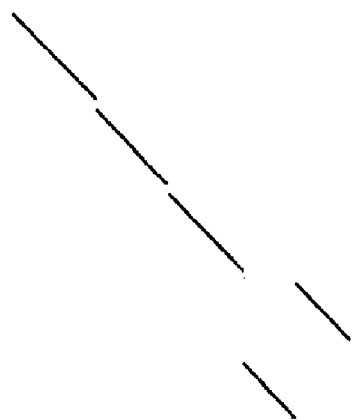
Figure 9:
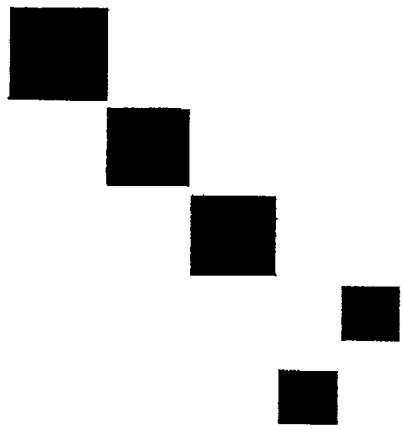
Figure 10:
Figure 11:

Referring to Table 3 and FIGS. 4 to 11 (which are line and area images having the same axes as those shown in FIGS. 2 and 3), Program 1 is a plagiarized source code having completely the same operation as the original program, and is a test program which is modified to make it hard for a user to visually recognize that the two programs have the same code. In the GST common string images shown in FIGS. 4 and 5, memory access logs entirely coincide with each other except for one part, and a discontinuity has a value very close to 0. FIG. 4 shows a line image for Program 1, and FIG. 5 shows a corresponding area image for Program 1. Program 2 is a test program in which an unnecessary memory access code that interferes with continuous memory access is inserted into a plagiarized source code performing the same operation as the original program. In this case, a continuity of memory access is not ensured, and thus plagiarism cannot be detected by using the GST common string images illustrated in FIGS. 6 and 7. FIG. 6 shows a line image for Program 2, and FIG. 7 shows a corresponding area image for Program 2. However, since a discontinuity is very close to 0, it can be determined that the program is plagiarized. Program 3 is a source code performing the similar function as the original program. In GST common string images illustrated in FIGS. 8 and 9, the length and area of the common string are significantly small, which shows that the program is not plagiarized. FIG. 8 shows a line image for Program 3, and FIG. 9 shows a corresponding area image for Program 3. Further, a large discontinuity shows that the program is not plagiarized. Program 4 is a source code totally different from the original program. In the GST common string images illustrated in FIGS. 10 and 11, short common strings are irregularly scattered, which shows that the program is not plagiarized. FIG. 10 shows a line image for Program 4, and FIG. 11 shows a corresponding area image for Program 4. Further, since a discontinuity is large, it can be determined that the program is not plagiarized.

Regarding a similarity value, although the common strings are almost similar except for one part as shown in FIGS. 4 and 5, if p=2, the similarity value is halved, and if p>2, the similarity value changes further. As shown in FIGS. 6 and 7, in a case where a continuity of an access log is intentionally eliminated by sporadically inserting unnecessary memory access codes into almost similar programs, a significantly low value (i.e., indicating low similarity) is obtained. As shown in FIGS. 10 and 11, even if locations of common strings (i.e., program execution sequence) are not orderly positioned, it cannot be concluded that a similarity is lower than the case where common strings are sequentially located. Accordingly, it can be concluded that plagiarism can be further accurately detected when using a discontinuity obtained by calculating a discontinuity level of common strings rather than using a similarity obtained by calculating a continuity level of the common strings.

Figure 12:
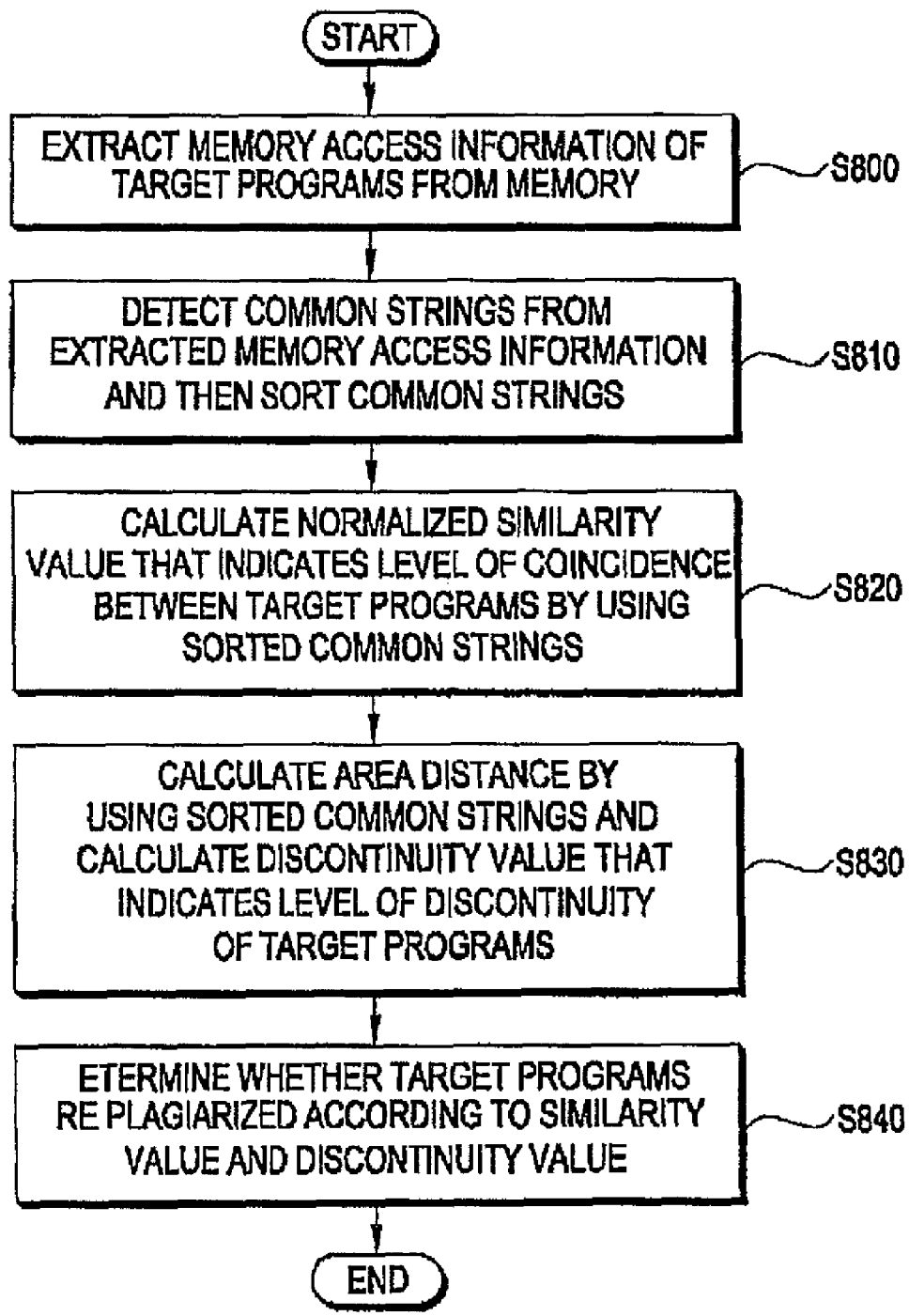
FIG. 12 is a flowchart illustrating a method of detecting program plagiarism according to an embodiment of the present invention.

FIG. 12 is a flowchart illustrating a method of detecting program plagiarism according to an embodiment of the present invention.

Referring to FIG. 12, the data extractor 110 extracts an access log of an original program and an access log of a target program from a memory accessed by the programs (step S800). In this case, the data extractor 110 uses a memory protection scheme (e.g., read, write, etc.) to extract information by checking memory addresses and values whenever the memory is accessed. The common string detector 120 enumerates values v, which are obtained from the access logs extracted from the original program and the target program, into strings $S_1$ and $S_2$, and then each of the strings $S_1$ and $S_2$ is subject to a tiling process according to a string comparison algorithm (i.e., a GST algorithm), thereby detecting a common string c (step S810). By using an array CS of the common strings detected by the common string detector 120, the similarity calculator 130 calculates a similarity value $m_p$ that indicates a level of coincidence between $S_1$ and $S_2$ (step S820). The discontinuity calculator 140 calculates a discontinuity value M that indicates a distance between strings by using the array CS of the common strings detected by the common string detector 120 (step S830). According to the similarity value $m_p$ calculated by the similarity calculator 130 or the discontinuity value M calculated by the discontinuity calculator 140, the plagiarism determining unit 150 determines whether the target program is plagiarized (step S840). If the similarity value $m_p$ is greater than a predetermined first reference value, the plagiarism determining unit 150 determines that the target program is plagiarized. If the discontinuity value M is less than a predetermined second reference value, the plagiarism determining unit 150 determines that the target program is plagiarized.

According to an apparatus and method for detecting program plagiarism of the present invention, program plagiarism can be detected when two programs are compared with each other without having to provide source programs. In particular, plagiarism can be accurately detected when a memory access sequence is not modified after changing a program source, for example, insertion of comments, changes in variables or function names, changes in locations of function declarations, integration and disintegration of functions, insertion of unnecessary non-executed codes, and so on. In addition, when plagiarism is detected by using a discontinuity value, plagiarism can be accurately detected even if a plagiarist intentionally inserts a code to generate unnecessary memory access.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. An apparatus, comprising at least one processor, for detecting program plagiarism, the apparatus comprising:
   a data extractor for extracting an access log of an original program and an access log of a target program to be compared with the original program, the access logs being extracted from at least one memory accessed by the programs;
   a common string detector for enumerating values into a first string including values from the access log of the original program and a second string including values from the access log of the target program, and for detecting one or more common strings that exist in both the first and second strings;
   a discontinuity calculator for calculating a discontinuity value that indicates a distance between the first and second strings by using an array of the detected common strings; and
   a plagiarism determining unit for determining that the target program is plagiarized if the calculated discontinuity value is less than a predetermined reference value.

2. The apparatus of claim 1, wherein the discontinuity calculator calculates the discontinuity value according to Equation:

$$M = \frac{\sum_{i=0}^{n}\{|x_{i+1} - (x_i + l_i - 1)| \times |y_{i+1} - (y_i + l_i - 1)|\}}{x_{n+1} \times y_{n+1}}$$

where $x_i$ denotes a starting point of $c_i$ in the first string composed of values obtained from the access log extracted from the original program, $y_i$ denotes a starting point of $c_i$ in the second string composed of values obtained from the access log extracted from the target program, and $l_i$ denotes the length of $c_i$, where $\{c_1, c_2, c_3, \ldots, c_n\}$ is the array of the detected common strings.

3. An apparatus, comprising at least one processor, for detecting program plagiarism, the apparatus comprising:
   a data extractor for extracting an access log of an original program and an access log of a target program to be compared with the original program, the access logs being extracted from at least one memory accessed by the programs;
   a common string detector for enumerating values into a first string including values from the access log of the original program and a second string including values from the access log of the target program, and for detecting one or more common strings that exist in both the first and second strings;
   a similarity calculator for calculating a similarity value that indicates a level of coincidence of the first and second strings by using an array of the detected common strings; and
   a plagiarism determining unit for determining that the target program is plagiarized if the calculated similarity value is greater than a predetermined reference value.

4. The apparatus of claim 3, wherein the similarity determining unit calculates the similarity value according to Equation:

$$m_p = \sum_{i=1}^{n} (l_i)^p$$

where $l_i$, denotes the length of $c_i$ where $\{c_1, c_2, c_3, \ldots, c_n\}$ is the array of the detected common strings.

5. A method of detecting program plagiarism, comprising the steps of:
   extracting an access log of an original program and an access log of a target program to be compared with the original program, the access logs being extracted from at least one memory accessed by the programs;
   enumerating values into a first string including values from the access log of the original program and a second string including values from the access log of the target program, and detecting one or more common strings that exist in both the first and second strings;
   calculating a discontinuity value that indicates a distance between the first and second strings by using an array of the detected common strings; and
   determining that the target program is plagiarized if the calculated discontinuity value is less than a predetermined reference value.

6. The method of claim 5, wherein, in the step of calculating a discontinuity value, the discontinuity value is calculated according to Equation:

$$M = \frac{\sum_{i=0}^{n} \{|x_{i+1} - (x_i + l_i - 1)|S|y_{i+1} - (y_i + l_i - 1)|\}}{x_{n+1} \times y_{n+1}}$$

where $x_i$ denotes a starting point of $c_i$ in the first string composed of values obtained from the access log extracted from the original program, $y_i$ denotes a staring point of $c_i$ in the second string composed of values obtained from the access log extracted from the target program, and $l_i$ denotes the length of $c_i$, where $\{c_1, c_2, c_3, \ldots, c_n\}$ is the array of the detected common strings.

7. A method of detecting program plagiarism, comprising the steps of:
   extracting an access log of an original program and an access log of a target program to be compared with the original program, the access logs being extracted from at least one memory accessed by the programs;
   enumerating values into a first string including values from the access log of the original program and a second string including values from the access log of the target program, and detecting one or more common strings that exist in both the first and second strings;
   calculating a similarity value that indicates a level of coincidence of the first and second strings by using an array of the detected common strings; and
   determining that the target program is plagiarized if the calculated similarity value is greater than a predetermined reference value.

8. The method of claim 7, wherein, in the step of the calculating a similarity value, the similarity value is calculated according to Equation:

$$m_p = \sum_{i=1}^{n} (l_i)^p$$

Where $l_i$ denotes the length of $c_i$ where $\{c_1, c_2, c_3, \ldots, c_n\}$ is the array of the detected common strings.

9. A non-transitory computer-readable medium having embodied thereon a computer program for executing the method of claim 5.

10. The apparatus of claim 1, wherein the values from the access log of the original program include values that are results of operations performed by the original program, and the values from the access log of the target program include values that are results of operations performed by the target program.

11. The apparatus of claim 3, wherein the values from the access log of the original program include values that are results of operations performed by the original program, and the values from the access log of the target program include values that are results of operations performed by the target program.

12. The method of claim 5, wherein the values from the access log of the original program include values that are results of operations performed by the original program, and the values from the access log of the target program include values that are results of operations performed by the target program.

13. The method of claim 7, wherein the values from the access log of the original program include values that are results of operations performed by the original program, and the values from the access log of the target program include values that are results of operations performed by the target program.

* * * * *